May 13, 1952     H. J. SCHULDT     2,596,871
SHEET METAL NUT ATTACHING MACHINE

Filed July 2, 1949     4 Sheets-Sheet 1

Inventor
Howard J. Schuldt
By
Spencer Willits, Helwig & Baillio
Attorneys

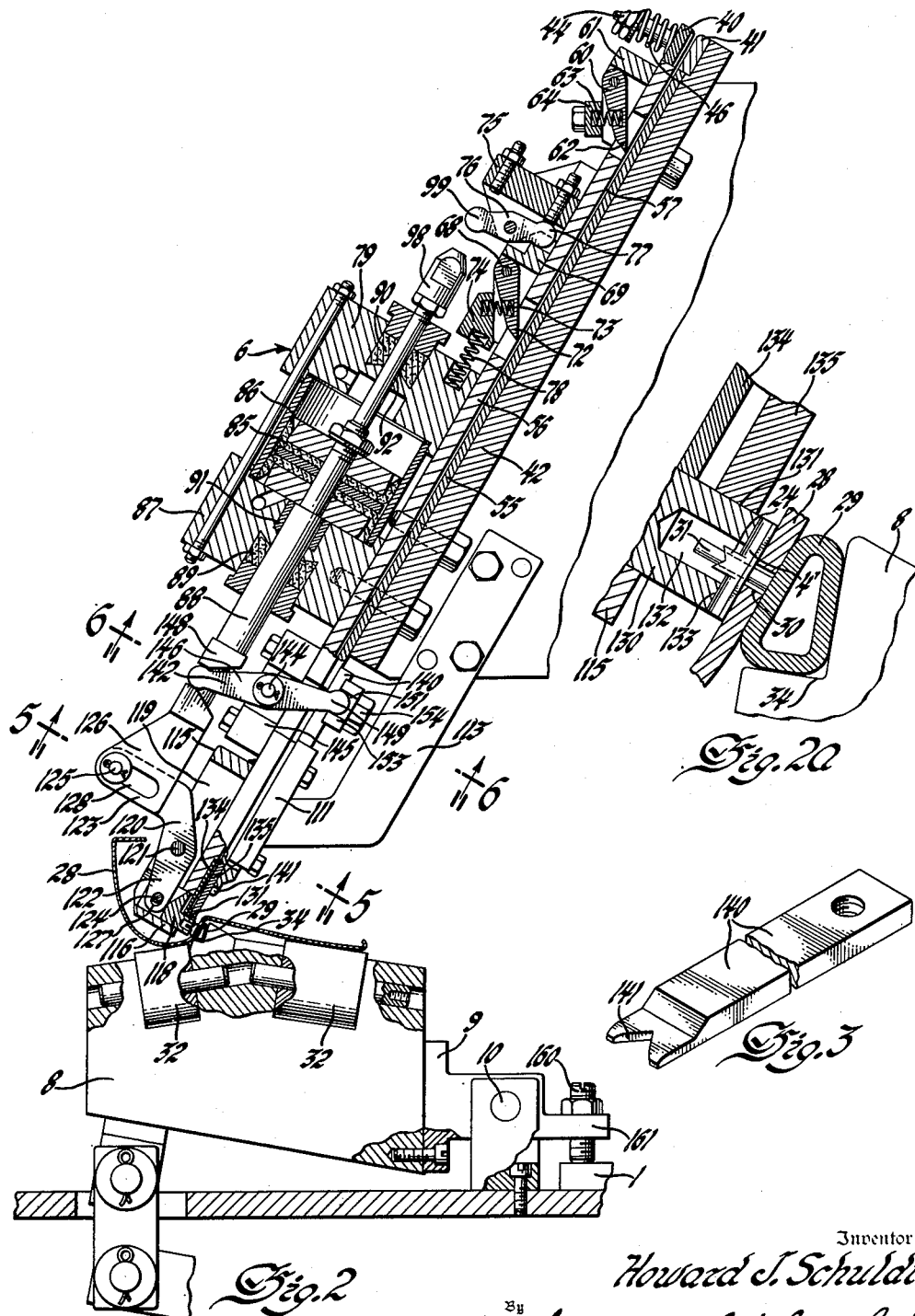

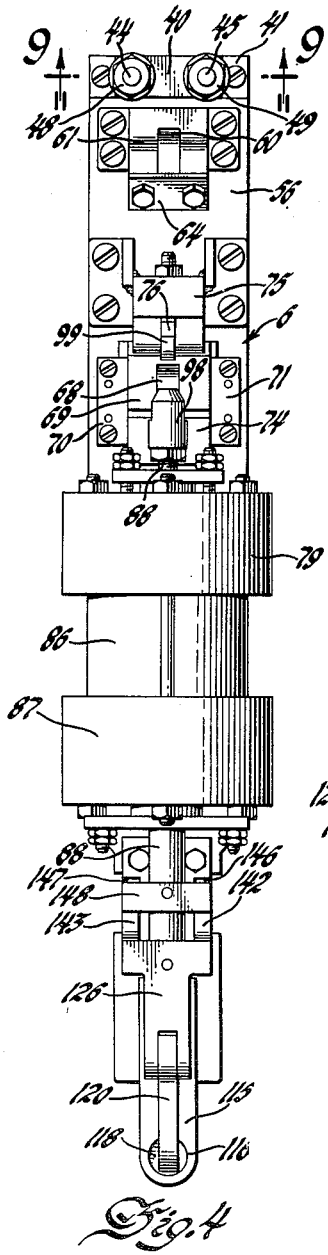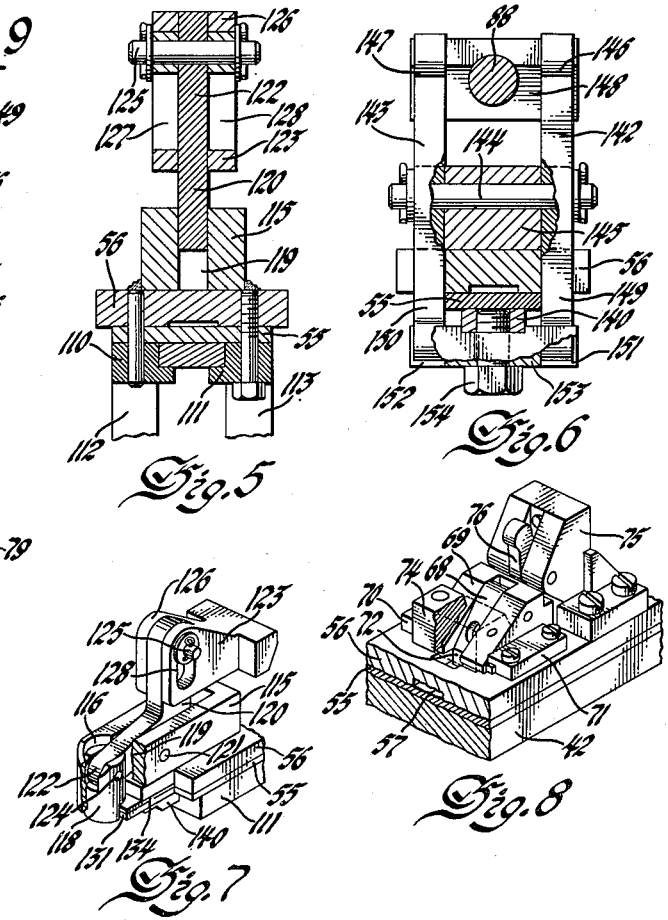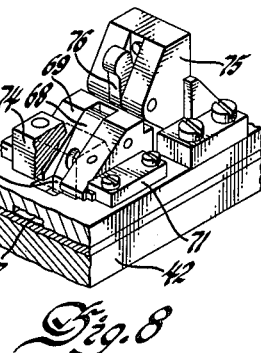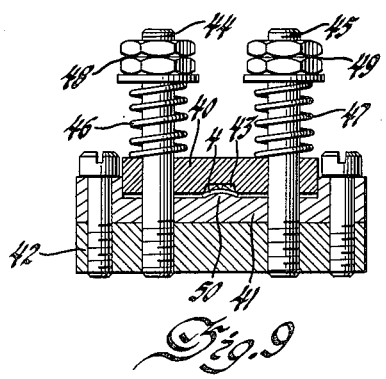

May 13, 1952  H. J. SCHULDT  2,596,871
SHEET METAL NUT ATTACHING MACHINE
Filed July 2, 1949  4 Sheets-Sheet 4

Inventor
Howard J. Schuldt
By
Spencer, Willits, Helmig & Baillio
Attorneys

Patented May 13, 1952

2,596,871

UNITED STATES PATENT OFFICE 2,596,871

SHEET METAL NUT ATTACHING MACHINE

Howard J. Schuldt, Detroit, Mich., assignor to General Motors Corporation, Detroit, Mich., a corporation of Delaware Application July 2, 1949, Serial No. 102,858

5 Claims. (Cl. 10—155)

This invention relates to assembling machines and particularly to a machine for attaching push-on type nuts or clips to the studs on a work piece.

A type of fastening which is coming into more and more frequent use for holding two or more light structural parts together comprises a stud secured to one of the parts and extending through an aperture in the other part, with a relatively thin spring metal clip acting as a retaining nut on the extended end. This type of nut frictionally retains itself on the stud, which may or may not be threaded or circularly grooved, by means of two or more tab-like finger sections arranged opposite each other adjacent the aperture for the stud. As there is no necessity to rotate the nut relative to the stud during their assembly the nut may be installed by merely pushing it coaxially onto the extended end of the stud and sliding it therealong into final position. Where the nuts are small and consequently difficult to handle with the fingers their proper positioning during installation on the studs is greatly facilitated by providing the nuts in strip form, i. e. a succession of integrally connected nuts in juxtaposed relation with each other.

With the above in mind it is the principal object of the instant invention to provide a tool or machine for feeding successive push-on type nuts in integrated strip form into positions opposite the studs of the work-piece, shearing the end nut from the strip and forcing it onto the work-piece stud, each of the functions being power actuated and responsive to manual control.

Other objects of the invention concern the arrangement of the elements for carrying out the aforesaid functions all of which will be clearly understood from the following description, having reference to the drawings, in which:

Figure 2 is an enlarged side elevational and sectional view of the strip operating mechanism and work-piece supporting anvil of the machine of Figure 1.

Figure 2A is a further enlarged fragmentary view similar to Figure 2 showing the work pieces in assembled relation on the anvil and the manner in which the nut is driven onto the stud by the punch.

Figure 3 is an enlarged perspective view of the work-piece locating finger employed in the machine.

Figure 4 is a front elevational view of the strip operating mechanism shown in Figure 2.

Figures 5 and 6 are enlarged sectional views taken on lines 5—5 and 6—6, respectively, of Figure 2.

Figures 1, 1A:
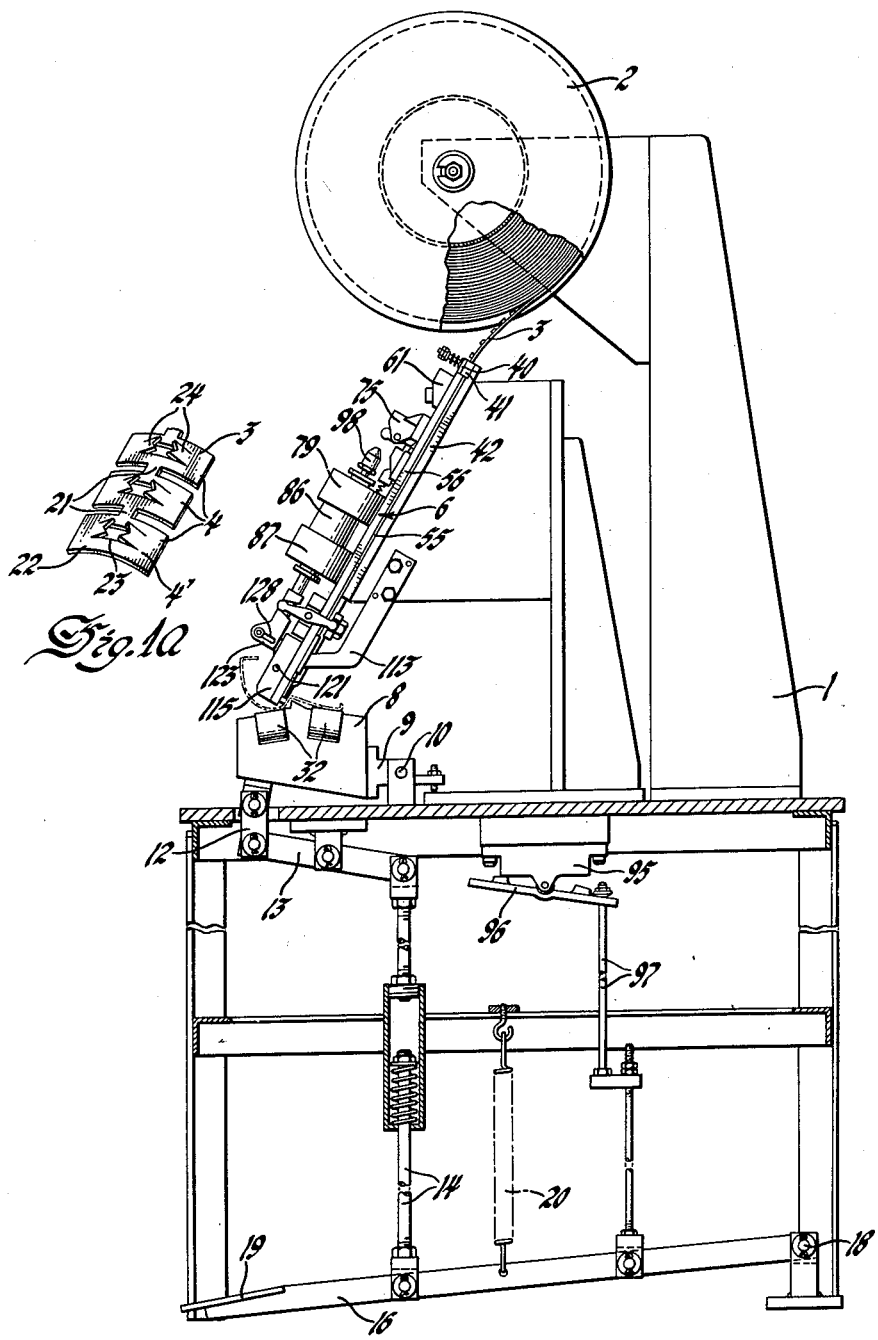
Figure 1 is a general view of the machine in side elevation, certain parts being broken away and in section, and with representative work-pieces being operated on as shown in broken lines.
Figure 1A is an enlarged fragmentary view in perspective of the general type of push-on nuts which my machine is designed to feed and attach.

Figures 7 and 8 are enlarged perspective views showing the strip shearing and strip feeding mechanisms, respectively, in somewhat greater detail than as viewed in Figures 1, 2 and 4.

Figure 9 is an enlarged sectional view taken on line 9—9 of Figure 4.

Figure 10:
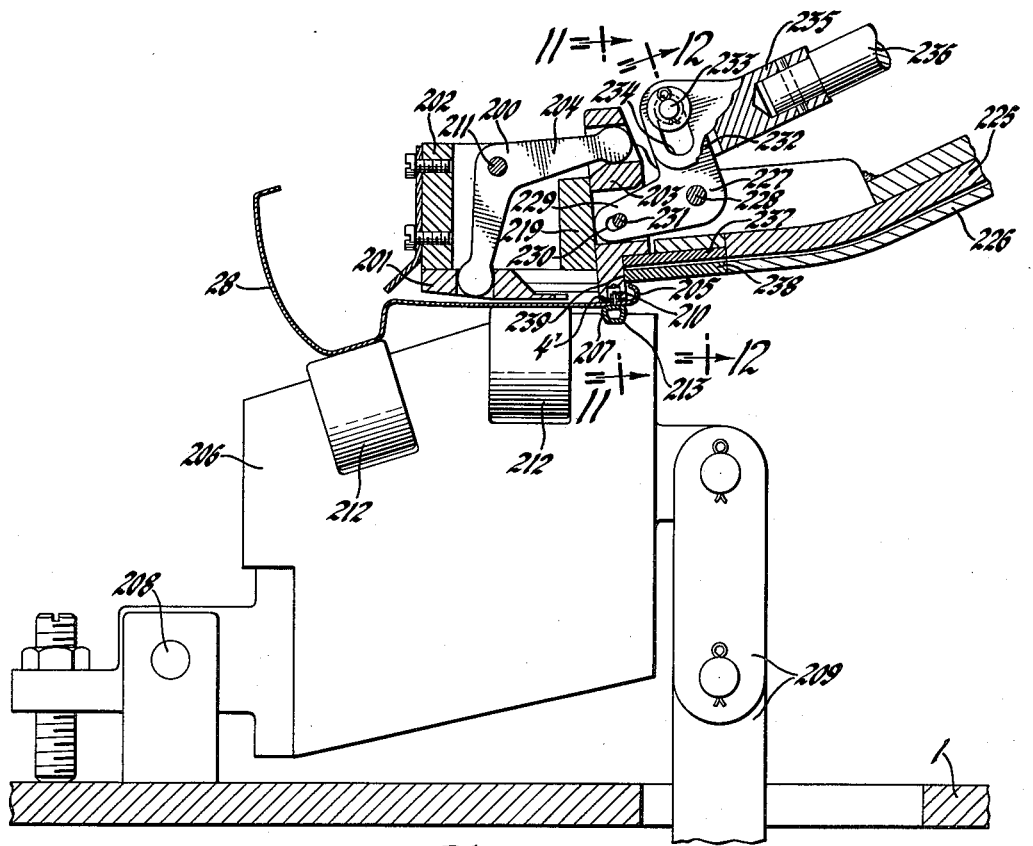

Figure 10 is an enlarged fragmentary view similar to that of Figure 2 but showing a modification of the machine for attaching like nuts to work-pieces arranged somewhat differently from that shown in Figures 1 and 2, and under conditions requiring the use of shorter studs.

Figures 11, 12, 13:
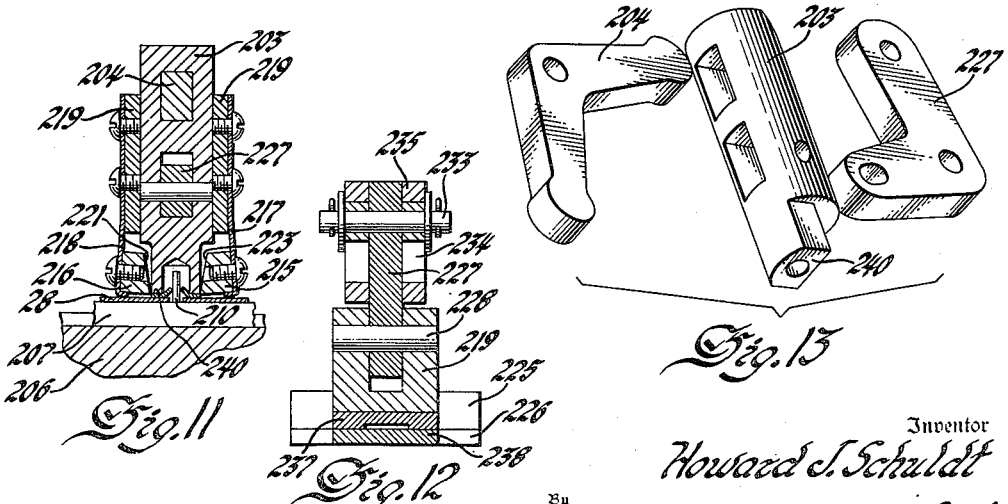

Figures 11 and 12 are sectional views taken on lines 11—11 and 12—12, respectively, of Figure 10.

Figure 13 is an enlarged exploded view of the punch and the bell cranks associated therewith in the machine of Figure 10.

With reference first to Figures 1–9 of the drawings it will be seen that my machine comprises a frame structure designated generally by the numeral 1 supporting a reel 2 on which is coiled a strip 3 of integrally attached juxtaposed push-on type nuts 4 (Figure 1A). 6 indicates a strip feeding, shearing and nut driving mechanism also supported by the frame and to which the strip is delivered as it unwinds from the reel. Opposite and below the lower end of the strip operating mechanism 6 is a work support or anvil 8 which is pivotally anchored at its rearward end 9 to the frame 1 for vertical movement about a pin 10. The anvil is supportable in its raised position as shown by a linkage system 12, 13, 14 connecting its forward end to a lever 16 which fulcrums on the frame at 18 and which can be held in its position as shown with downward pressure by the operator's foot on the pad 19. Biasing means such as the tension spring 20 between the lever 16 and a cross brace of the frame serves to return the lever to a relatively elevated position when the pressure of the operator's foot is relieved from the pad, the anvil 8 simultaneously dropping by force of gravity to a retracted position accommodating removal or repositioning of the work.

The nuts 4 which the machine is designed to attach are made of spring steel or equivalent resilient material, and as best shown in Figure 1A are of well-known form except that each is integrally joined to the nut adjacent thereto by a narrow neck section 21 which is sheared just prior to driving each successive end nut 4' onto a stud of the work. The individual nuts it will be noted have a slightly bowed body 22 with a central aperture 23 for passage of the stud, and have oppositely disposed tab-like portions or fingers 24 defining the aperture which are bent up slightly from the general plane of the body to resiliently press on the stud and effect a one-way locking engagement therewith. The specific structural details of the nuts may be varied without departing from my invention as embodied in the machine.

Further, for purposes of illustrating one specific application of my machine, two work pieces 28 and 29 which are to be secured together are shown mounted on the anvil 8. Work piece 28 represents an automotive vehicle door inside trim member, conventionally referred to as a "hang-on panel," and piece 29 is a decorative molding—both pieces being shown in transverse section. As best shown in Figure 2A the hang-on panel 28 is provided with apertures 30 for passage of studs 31 projecting from and either welded or otherwise anchored to the molding piece 29.

Where the work pieces are of considerable length and are to be secured together at spaced intervals, as in the case of the hang-on panel 28 and molding piece 29, the anvil 8 is preferably provided with one or more rollers 32 for resting the work and facilitating its longitudinal movement between successive attachment locations. Intermediate the rollers 32 the upper surface of the anvil is shaped to provide a notch-like seat 34 to accommodate and firmly support the molding piece 29 while a nut is being applied to the stud.

Referring now to the strip operating mechanism 6, as the strip 3 leaves the reel 2 it passes first between upper and lower snubber plates 40 and 41 (Figure 9), the latter of which is fixedly mounted to the rear end of an elongated supporting plate or table 42 which in turn is supported by the frame 1 of the machine. The upper snubber plate 40 has a channel 43 provided in its bottom surface of a depth and width just sufficient to clear the bent-up fingers 24 of the nuts 4 on the strip, with the portions of the plate's bottom surface laterally adjacent the channel 43 being adapted to rest on the body 22 of the nut. Two pilot studs 44 and 45 secured to the table 42 and passing freely through apertures provided therefor in the upper snubber plate serve to retain the latter in its superimposed position atop the lower snubber plate 41, and springs 46 and 47 compressed between nuts 48 and 49 on the pilot studs and the upper snubber plate provide a resilient clamping force on the strip 3 as it is drawn from the reel 2. The upper surface of the lower snubber plate 41 preferably is provided with a ridge 50 of curved section to conform with the bowed undersurfaces of the strip nuts 4 and thereby serves as a track for guiding and firmly supporting the nut bodies under the snubbing pressure produced by the springs 46 and 47.

The nut strip 3 as it leaves the snubber mechanism just described next passes between cooperating guide elements or plates 55 and 56 each of which is fixedly secured to the table 42. As will be seen in Figures 2 and 8 the upper guide plate 56 has a groove or recess 57 formed in its under surface, which in cooperation with the flat upper face of the lower guide plate 55 serves as an enclosed passage through which the strip 3 may freely slide during its movement longitudinally of the table 42.

As a means of preventing retrograde movement of the strip 3 during operation of the machine there is provided a one-way clutch mechanism including a pawl 60 which is pivotally supported at its upper end between the arms of a U-shaped bracket 61 fixed to the upper guide plate 56 just forwardly of the snubber mechanism. The pawl extends downwardly and forwardly through an opening provided therefor in the upper guide plate 56 and has its lower end 62 biased into contact with the strip by a spring 63 compressed between the pawl and a bridge piece 64 secured to the forward ends of the U arms.

Forwardly of the clutch mechanism just described is a strip feeding mechanism incorporating a similar pawl 68 pivotally supported at its upper end between the arms of a U-shaped slide 69 which rests on the upper guide plate 56 between a pair of slide retainer plates 70 and 71 (Figure 8). This pawl also extends downwardly and forwardly through an opening in the upper guide plate 56 and has its lower end 72 biased into contact with the strip by a spring 73 compressed between the pawl and a bridge piece 74 secured to the forward ends of the U arms. Rearwardly of the slide 69 on the table 42 is a fixed bracket 75 to which is pivoted a rocker or bell crank 76, the lower arm 77 of which operates to move the slide 69 forwardly when the bell crank is rotated in a clockwise direction (as viewed in Figure 2) by the power means to be hereinafter described. A compression spring 78 disposed between the bridge piece 74 on the slide and the rear cylinder head 79 of this power means serves to bias the slide rearwardly and thereby effect the return of both the slide and the bell crank 76 to their positions as shown during each forward stroke of the power means.

The power means comprises a double-acting piston 85 operating in a cylinder 86 which is closed at both ends and supported by front and rear cylinder heads 87 and 79 fixed to the table 42. Carried by the piston is a piston rod 88 which extends through stuffing boxes 89, 90 and bearings 91, 92 in the cylinder heads. Fluid pressure lines (not shown) connect the respective ends of the cylinder 86 to a pressure supply system through a reversing valve 95 (Figure 1) having a rocker-like operating lever 96, one end of which is connected through the adjustable linkage 97 to the foot operated lever 16. When the valve operating lever 96 is in the position shown (foot operated lever 16 being depressed) the rear end of the cylinder 86 is pressurized while its front end is exhausted through the valve 95, and the piston 85 is at the forward end of its stroke. Contrariwise, when the operator's foot pressure is released from the pad 19 and the lever 16 swings upwardly under the action of its return spring 20, the linkage 97 moves upwardly also whereupon a biasing spring (not shown) causes the valve operating lever 96 to swing counterclockwise and reverse the setting of valve 95, thereby pressurizing the front end of the cylinder 86 and moving the piston to the rear end of its stroke. The rear end 98 of the piston rod engages the upper arm 99 of the bell crank 76 during the latter portion of the piston's rearward stroke, rotating the bell crank in a clockwise direction (as viewed in Figure 1) and thereby effecting the forward stroke of the slide 69 and advancement of the nut strip 3 a predetermined distance.

The table 42 terminates just forwardly of the front cylinder head 87 and the portions of the upper and lower strip guide plates 56 and 55 extending beyond the same are supported by a pair of finger locating guides 110, 111 (Figure 5) which are in turn fixedly secured to the frame 1 by brackets 112, 113. Anchored as by welding to the upper guide plate 56 is an elongated block 115 having an aperture 116 therethrough adjacent its forward end in which is slidably supported a strip shearing punch 118. The block 115 also has an elongated slot 119 which connects with the punch aperture 116 and extends rearwardly therefrom to accommodate swinging movements of a punch actuating bell crank 120. The bell crank 120 is pivotally supported in the slot 119 on a pivot pin 121, and has forwardly and upwardly extending arms 122 and 123 which are connected by pins 124 and 125 to the punch 118 and to a fitting 126 carried by the front end of the piston rod 88, respectively. 127 and 128 are elongated slots in the arm 123 and fitting 126 to accommodate the rotation of the bell crank to the linear movement of the punch and connecting rod. The punch has a lower projecting portion 130 which overhangs the forward or strip shearing edge 131 of the lower strip guide plate 55, and is cooperable therewith during the forward stroke of the piston 85 to shear the end nut 4' from the strip 3 and force it onto the stud 31 of the work. A recess 132 is provided in the nut engaging end face 133 of the punch portion 130 for clearance with the stud and the projecting tabs or fingers 24 of the nut (Figure 2A) during this strip shearing and nut driving stroke. 134 and 135 are replaceable hardened inserts in the upper and lower guide plates 56, 55, which provide a wear-resisting supporting surface for the nut strip adjacent the punch.

As a means of facilitating the proper positioning of the work transversely on the anvil 8 so that stud 31 will be aligned with the end nut 4' on the strip during the shearing stroke of the punch, there is provided the work locating finger 140 (Figure 3). This finger is slidably carried by the finger locating guides 110, 111 under the lower strip guide plate 55, and has a notched forward end 141 which in the normal position of the finger (operator's foot pressure released from the lever 16) is stationed a short distance forwardly of the punch. This notched end serves to receive the stud 31 of the work as the latter is raised by the anvil when the operator depresses the foot lever 16. To automatically retract the finger 140 to its position shown in Figure 2 during the strip shearing and nut driving stroke of the punch, as well as to effect its forward projection to the work locating position just referred to, there is provided a pair of rockers or bell cranks 142 and 143 (Figure 6) which fulcrum on the opposite ends of a pin 144 mounted in a pad 145 on the stationary upper guide plate 56 between the front cylinder head 87 and the block 115. The arms 146 and 147 of these bell cranks straddle the connecting rod 88 and are slidably keyed thereto between the end fitting 126 and a keeper 148. The oppositely extending arms 149 and 150 engage slots 151 and 152 in the opposite ends of a cross bar 153 secured as by a bolt 154 to the work locating finger 140. It will thus be seen that the retraction of the work locating finger accompanies the shearing stroke of the punch, and conversely, the punch is retracted simultaneously with the forward projection of the finger.

The operation of the machine as described is believed clear from the references made thereto in the course of explaining the functions of its various elements and sub-assemblies, it being only necessary at this time to point out that with proper adjustment of the linkages by which the anvil 8 and the reversing valve 95 are controlled by the foot lever 16 the anvil will reach its raised position as shown prior to the time at which the valve operating lever 96 also takes its position as shown. This is necessary since the stud 31 of the work on the anvil must be in a position of alignment with the end nut 4' of the strip while this nut overhangs the forward end or strip shearing edge 131 of the lower guide plate 55 and prior to the start of the strip shearing action of the punch 118. An adjustable set screw 160 carried by a projecting arm 161 of the anvil 8 is arranged to abut the frame 1 of the machine for the purpose of establishing the proper position of the work during the nut attaching operation.

The machine shown in Figures 10–13 involves a modification from that previously described, and is particularly adapted to the attachment of studs which extend only a short distance from the nut seating surface of the work-piece. In this machine, the bell crank 200 for actuating the work locating finger 201 is pivoted on a pin 211 in a supporting bracket 202 located forwardly of the punch 203, and its driven arm 204 is operatively connected to the upper end of the punch. The work locating finger has its notch at the rear end and is slidably mounted forwardly of the punch where it does not interfere with the bent up lower edge 205 of the hang-on panel 28. The anvil 206 is also modified, its rollers 212 and notch-like seat 213 being located as shown to accommodate the changed positions thereon of the hang-on panel and the molding piece 207, as required for securing the latter adjacent the hang-on panel edge 205. Also, the anvil is pivoted at its forward end to a pin 208, the rear end of the anvil being supported by articulated links 209 connecting it to the foot lever 16.

Because the studs 210 projecting from the molding piece 207 are substantially shorter than those of the previous molding piece 29 and therefore do not extend as close to the end nut 4' on the strip, the nuts after being sheared from the strip must be guided down to the studs to insure their arrival thereon in proper alignment. For this purpose, there is provided a pair of nut guiding members 215 and 216 which are resiliently suspended by leaf springs 217 and 218 depending from opposite sides of the block 219 which slidably supports the punch. These nut guiding members have oppositely disposed nut contacting faces 220 and 221 which incline inwardly and downwardly toward each other, and are urged toward one another by the leaf springs. As the nut is forced downwardly therebetween by the punch the faces 220 and 221 press against the side edges of the nut body and guide it onto the end of the projecting stud 210.

Similarly as in the case of the machine previously described, the nut strip is intermittently advanced between upper and lower guide plates 225 and 226 toward the punch, which is reciprocably actuated by a bell crank 227 pivotally mounted on a pin 228 supported in the block 219. The forwardly extending arm 229 of this bell crank has an elongated slot 230 engaging a cross pin 231 carried by the punch, and its upwardly extending arm 232 carries a pin 233 engaging an elongated slot 234 provided in the fitting 235 attached to the front end of the piston rod 236. 237 and 238 are hardened plates forming forward extensions of the upper and lower strip guide plates 225 and 226 and serve to support the strip of nuts adjacent the punch while the latter shears off the end nut from the strip. The forwardmost end 239 of the hardened plate 238 constitutes a stationary shearing edge with which the lower end 240 of the punch cooperates during its downward stroke to effect the shearing action.

I claim:

1. In a machine of the class described, a stationary frame including an elongated table supporting a pair of guide plates for guiding a strip of integrated nuts, one of said plates terminating in a strip shearing edge, a punch slidably supported by the table for reciprocatory movement in shearing relation with the shearing edge, said punch having a nut engaging end face adapted for forcing an individual nut onto a stud after first shearing such nut from the strip, an anvil for supporting the work-piece with its stud in position to receive the nut, said anvil being pivotally connected to the frame for movement into and out of said nut receiving position, a foot operated lever with a connecting linkage to the anvil for effecting control of said anvil movement, a bell crank fulcrumed to the table with a first lever arm pivotally connected to the punch, a closed fluid pressure cylinder fixed to the table and provided with a double acting piston therein, a piston rod carrying said piston and slidably extending through at least one end of the cylinder, one end of said piston rod being pivotally connected to a second lever arm of said bell crank, a work piece locating finger reciprocably slidable on the table longitudinally with the strip and having a notched end portion against which the stud of the work piece may be positioned for purposes of alignment prior to applying a nut thereto, a second bell crank fulcrumed on the table with lever arms operatively connected to the piston rod and locating finger respectively for effecting the retraction of the locating member during the strip shearing and nut applying stroke of the punch, a slide reciprocably movable on the table longitudinally with strip, a strip feed pawl pivotally carried by the slide and arranged to lockably engage and advance the strip toward the punch during the forward stroke of the slide and to ratchet on the strip during the return stroke thereof, a third bell crank fulcrumed to the table with lever arms in operative engagement with the slide and the piston rod respectively for effecting the forward stroke of the slide during the rearward stroke of the piston, a source of fluid pressure, and fluid connections between said source and opposite ends of the cylinder including a valve responsive to the position of the foot lever for selectively controlling the pressurization of the respective ends of the cylinder.

2. In a machine of the class described, a stationary frame having means for guiding the endwise advancement of a strip of integrally connected juxtaposed push-on type nuts, a strip shearing edge on the frame opposite which successive sections of the strip between adjacent nuts may be located preparatory to severing the end nut from the strip, a punch slidably supported by the frame for reciprocable movement toward and away from the strip and having a nut engageable end cooperative with said shearing edge to shear the end nut from the strip during its stroke toward the strip, a member slidably supported by the frame for reciprocable movement longitudinally of the strip, a lost-motion connection between the punch and said member whereby said member is caused to move toward the shearing edge during the latter portion of the retracting stroke of the punch and in the opposite direction during the first portion of the shearing stroke of the punch, a pawl movably carried by said member and pivotally arranged thereon to drivably engage the strip during movement of said member toward the shearing edge and to slide on the strip during movement of said member in the opposite direction, an anvil having a connection to the frame and a work receiving and backing portion movable about said connection between positions remote and adjacent to the punch for receiving and removal of the work, power operating means for said punch, and a manually actuatable lever controlling both said power operating means and movement of said anvil whereby the punch is actuated in its strip shearing direction when said portion is adjacent the punch.

3. In a machine of the class described, a stationary frame including guides for slidably supporting a strip of integrated nuts, a stationary strip shearing element, a reciprocable punch slidably guided by the frame for movement in strip shearing relation with said shearing element for shearing the end nut from the strip and forcing it slidably onto a stud of a work-piece, power means for effecting the strip shearing movement and the return movement of the punch, a retractible work-piece supporting anvil pivotally connected to the frame having a work-piece receiving and backing portion movable between positions adjacent and remote from the punch for receiving and removal of the work-piece, an anvil connected lever fulcrumed on the frame and manually actuatable by the operator's foot for pivotally moving the anvil portion between said positions, and a control for said power means responsive to the position of said lever whereby the punch is moved in its strip shearing direction when said portion is adjacent the punch.

4. In a machine of the class described, a machine frame including strip guiding means and a strip shearing edge, a reciprocable strip shearing punch slidably supported by the frame, a reversible motor mounted on the frame, a member driven by said motor having reciprocatory movement longitudinally of said guiding means, motion translating means interconnecting said punch and member, strip feeding means operable in timed relation to reciprocation of the punch, motor reversing means, a manually operable member controlling said reversing means, and a retractible work supporting anvil connected to the frame and having a work receiving and backing portion, said anvil being movable about its connection to the frame by said manually operable member whereby said portion is moved to a position adjacent the punch when the punch is on its shearing stroke and to a position remote from the punch to permit receiving and removal of work when the punch is on its return stroke.

5. In a machine of the class described, strip guiding means terminating in a strip shearing edge, a reciprocable strip shearing punch cooperable with said shearing edge, a strip feeding means operable in timed relation to reciprocation of the punch, punch reciprocating means including power operated means, work supporting means having a work receiving and backing portion movable about an axis displaced from the intersection of said punch and said strip guiding means between positions adjacent and remote to the punch for receiving and removal of the work, and a manually actuatable lever controlling both said power operated means and movement of said work supporting means, whereby the punch is actuated in its strip shearing direction when said portion is adjacent the punch.

HOWARD J. SCHULDT.

REFERENCES CITED

The following references are of record in the file of this patent:

UNITED STATES PATENTS

| Number | Name | Date |
|---|---|---|
| 1,186,169 | Burgess | June 6, 1916 |
| 1,373,461 | Stuart | Apr. 5, 1921 |
| 1,373,462 | Stuart | Apr. 5, 1921 |
| 1,615,276 | Hudson | Jan. 25, 1927 |
| 1,885,116 | Kuehner | Nov. 1, 1932 |
| 1,890,131 | Schaub | Dec. 6, 1932 |
| 1,931,760 | Hermandorfer | Oct. 24, 1933 |
| 1,959,602 | Stanbon | May 22, 1934 |
| 2,156,015 | Greiner | Apr. 25, 1939 |
| 2,284,676 | Nielson | June 2, 1942 |
| 2,315,209 | Kost | Mar. 30, 1943 |
| 2,359,140 | Meitner | Sept. 26, 1944 |
| 2,390,120 | Poupitch | Dec. 4, 1945 |